C. E. & J. E. POINTON.
BREAD MAKING PLANT.
APPLICATION FILED AUG. 6, 1910.

1,062,795.

Patented May 27, 1913.
4 SHEETS—SHEET 1.

WITNESSES
W. P. Burke
John C. Sanders

INVENTORS
Charles E. Pointon
John E. Pointon
BY Wm. Wallace White
ATTY

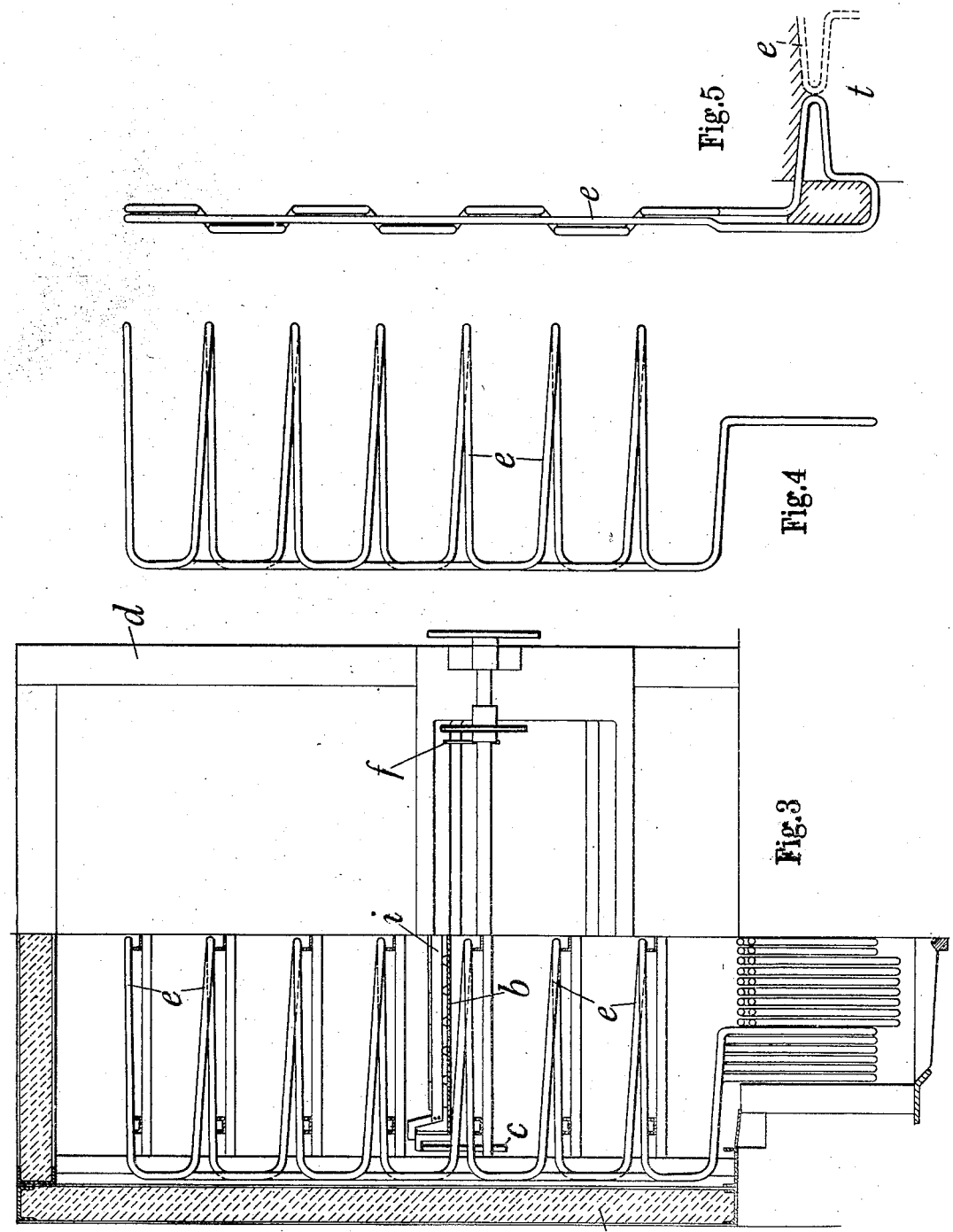

C. E. & J. E. POINTON.
BREAD MAKING PLANT.
APPLICATION FILED AUG. 6, 1910.
1,062,795.
Patented May 27, 1913.
4 SHEETS—SHEET 4.
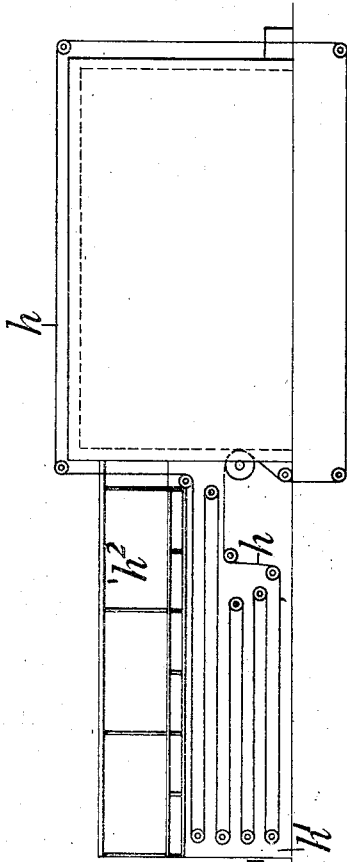
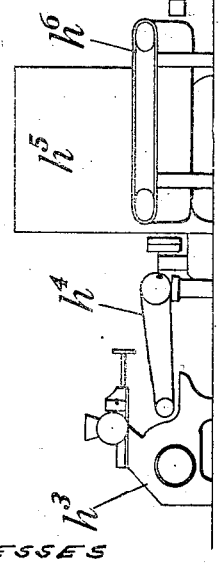
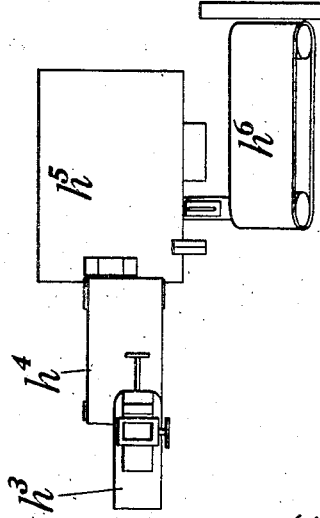
WITNESSES
W. P. Burke
John C. Sanders
INVENTORS
Charles E. Pointon
John E. Pointon
BY Thos. Wallace White
ATTY

UNITED STATES PATENT OFFICE.

CHARLES E. POINTON AND JOHN E. POINTON, OF PETERBOROUGH, ENGLAND.

BREAD-MAKING PLANT.

1,062,795.

Specification of Letters Patent.

Patented May 27, 1913.

Application filed August 6, 1910. Serial No. 575,925.

*To all whom it may concern:*

Be it known that we, CHARLES EDWARD POINTON and JOHN EDWARD POINTON, subjects of Great Britain, residing at Peterborough, in the county of Northants, England, have invented certain new and useful Improvements Relating to Bread-Making Plants, of which the following is a specification.

In connection with mechanical equipments for bakeries various proposals have been made for subjecting the dough portions on discharge from the molding and proving machines to the baking heat while on a continuously or intermittently moving conveyer or like apparatus.

The present invention has for its object to provide improved bread making plants, comprising baking apparatus adapted for automatic working synchronously with the prover, or fermentation chamber, into which the bread dough is charged after division and molding to form the required loaf portions.

Figure 1:
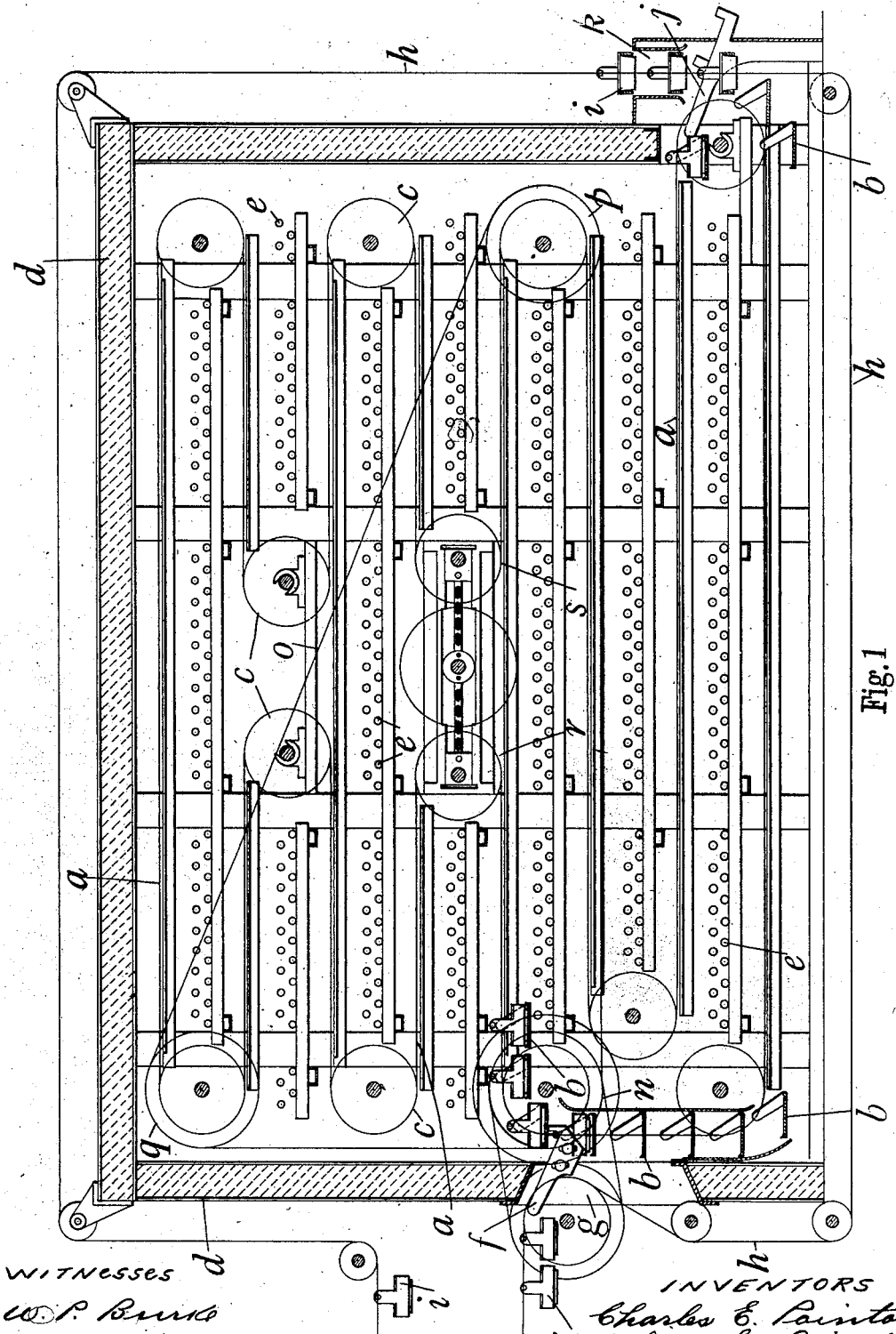
Figure 2:
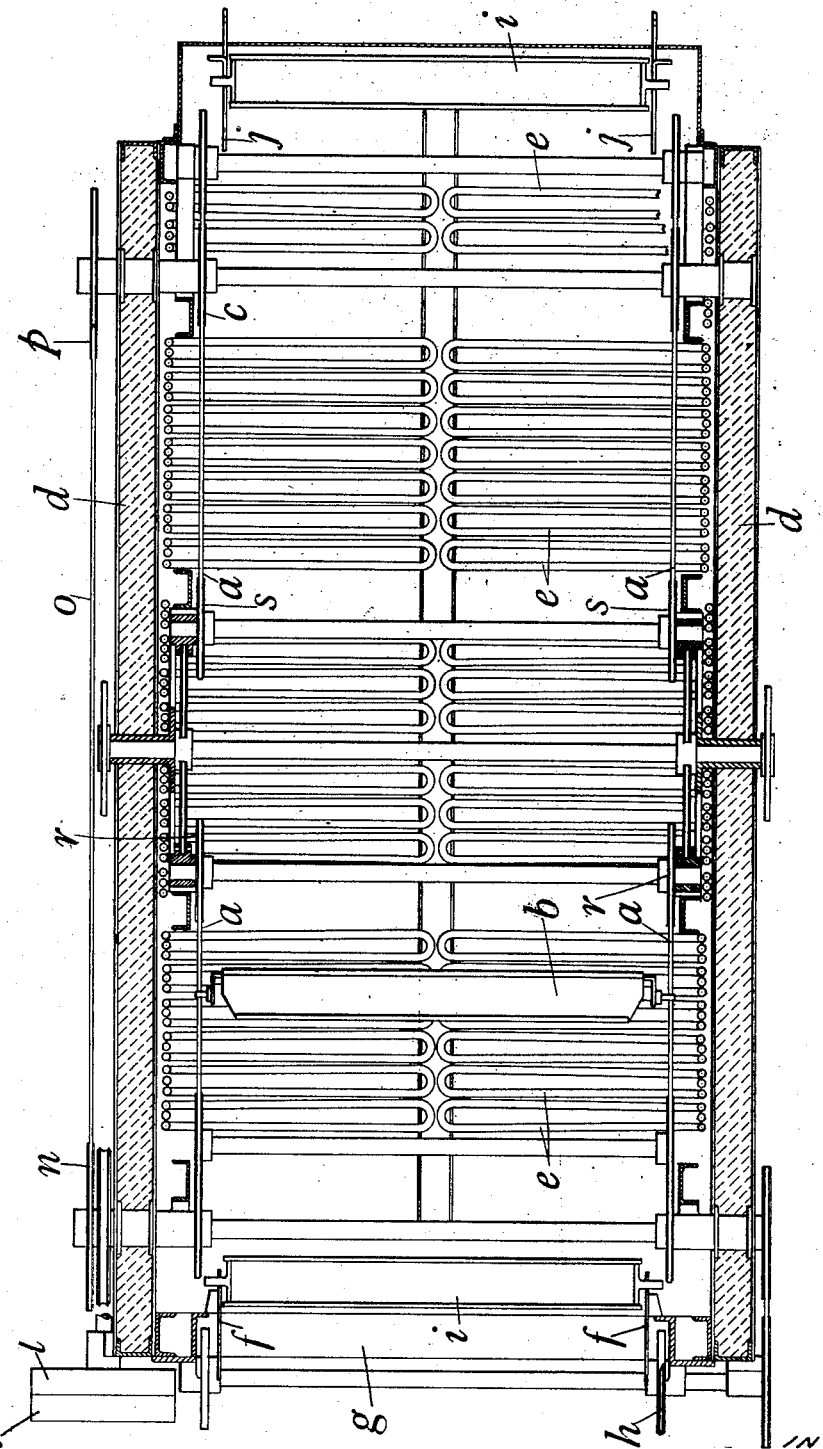

Referring to the four accompanying sheets of explanatory drawings, Figure 1 is a sectional side elevation, Fig. 2 a sectional plan and Fig. 3 a sectional end elevation, representing one form of baking apparatus as constructed in accordance with this invention. Figs. 4 and 5 are elevations, at right angles to each other, of one of the zigzag or circuitous coils of tubing employed for heating the oven or baking chamber. Fig. 6 is an elevation and Fig. 7 a plan representing in diagram form, the complete bread making plant.

The same reference letters in the different views indicate the same or similar parts.

In one convenient manner of carrying the invention into effect a pair of endless chains as $a$ carrying between them a number of pivotally mounted trays $b$ are passed over suitably arranged pulleys as $c$ so that the trays are caused to travel along alternately ascending and descending vertical paths, or backward and forward along horizontal paths (as illustrated in the drawings), or through any other circuitous course. The greater portion of the chains is inclosed in an oven or baking chamber, formed by the non-conducting inclosing walls as $d$ and heated by Perkins tubes $e$ or other equivalent means, so that the dough portions passing therethrough are subjected to a heating or baking action.

At the front and rear of the chamber the chains $a$ with their trays $b$ may be arranged to pass to the exterior over guide pulleys, to facilitate charging and discharging. Or the chains may be arranged for both operations to be effected at the same side of the chamber. Any convenient means such as pinions on the tray pivots engaging with short fixed racks may be employed for inverting the trays and so automatically discharging the contents. Further, the trays may be automatically charged by suitable chutes into which the dough portions are delivered by a conveyer from the proving machine or fermentation chamber working synchronously or in union with the working of the oven conveyer. Thus, in the example illustrated in the drawings, a shoot as $f$ is arranged at the mouth or entrance aperture $g$ of the baking chamber, so that as the chain or chains as $h$ from the proving machine $h'$ pass in proximity to the said chute $f$, the dough or loaf containers as $i$ consisting of open frames into which the tins or boxes containing the dough are placed are automatically detached or withdrawn by the chute from the prover chain and picked up, as is clearly shown at Fig. 1, by the advancing trays $b$ of the oven or baking chamber chains $a$. The prover chain $h$ continues its journey beneath the baking chamber and passes up on the opposite side where it receives the baked loaves from the baking chamber conveyer shelves or trays $b$, the transference being effected by another chute $j$ similar to the chute $f$ aforesaid which detaches the container $i$ from the chains $a$ and diverts them into the path of the chain $h$ so that the latter may pick them up. The chain or conveyer $h$, with the baked loaves therein, may pass through the bread or store room for the discharge of its contents before returning to the prover, or the baked loaves may be removed by hand immediately the conveyer leaves the discharge aperture $k$ of the oven or baking chamber.

As the prover chains or conveyer $h$ returns to the prover the dough or loaf containers $i$ attached thereto are greased and prepared by an operative standing on the platform $h^2$, for the reception of further dough portions coming from the preparatory portion of the plant, consisting of the dividing machine $h^3$, preliminary molder $h^4$, preliminary prover $h^5$ and finishing molder $h^6$.

Intermittent or continuous motion may be given to the chain or conveyer *a* to suit the method of charging and discharging the dough portions, the rate of motion being such that the time occupied in traversing the chamber is that required for proper baking. The driving arrangement shown in the drawings comprises the fast and loose belt pulleys *l m* and worm gearing operating the chain wheel *n* from which a like rotary motion is transmitted, by chain *o* to the driving chain wheels *p* and *q*. From the said wheels *n*, *p* and *q* (which are secured to shafts carrying driving wheels for the chain or chains *a*), an intermittent motion is imparted, by means of any known mechanism to the oven conveyer. Such a distribution of the driving effort at three positions rather than at one insures a more steady and reliable motion.

Provision for tightening the conveyer chains is afforded by mounting the guide pulleys *r* and *s* on sliding carriages or bearings which can be drawn together by any ordinary mechanical means, or be tensioned by a hanging weight or otherwise.

The Perkins tubes for the heating of the oven or baking chamber are disposed in two sets, one set being inserted from the one side and the other set from the opposite side of the oven. Each set extends to the center of the chamber, or nearly so, as indicated at Fig. 3 which shows one of the sets. Each of the two sets or batteries of tubes is made up of a number of individual and independent coils of a zig-zag or circuitous form, such as shown at Figs. 4 and 5 which represent one of such coils. The portion which enters the furnace is shown at the lower part of Fig. 5 where *t* represents the furnace.

As will be clearly seen at Figs. 1 and 3 of the drawings, the horizontal portions of the tube coils in each set or battery or the portions which project to or toward the center of the heating chamber, form as it were a tier of shelves between which the loaves or dough portions are conveyed in series, in a zig-zag course, on the conveyer trays *b*. Throughout such course the dough portions are therefore subjected to a very effective top and bottom heat due to their close proximity to the tubes *e* which are both above and below them during their progress from the entrance to the exit of the bakery chamber.

We do not limit ourselves to circulating tubes of the form shown by Figs. 4 and 5, and instead of the furnace being situated underneath the oven it may be arranged at the side of same or two furnaces may be employed one at either side of the oven.

By employing a circuitous conveyer with heating elements therefor as above described, a baking chamber of relatively small dimensions can be employed for a given continuous output of loaves. The heating can in consequence be easily regulated; further, an economy can be effected in floor space and the apparatus constructed at comparatively small initial cost.

The upper part of the chamber or the part above the mouth or inlet opening *g* may be kept charged with steam, for imparting bloom to the loaves or dough portions, while the part below the mouth or inlet is kept free from steam, allowing the final baking to take place in a dry atmosphere. It will be understood that the said mouth or opening *g* serves to prevent the steam from descending below it.

Having thus described our invention, what we claim as new and desire to secure by Letters Patent is:—

In a bread making plant, the combination consisting of proving and baking chambers, a conveyer passing circuitously through the interior of the baking chamber, a conveyer passing circuitously through the proving chamber and around the baking chamber and working synchronously with the conveyer within said baking chamber, means for automatically transferring the bread portions from said second-mentioned conveyer to said first-mentioned conveyer, and means for automatically transferring the bread portions from said first-mentioned conveyer to said second-mentioned conveyer.

In testimony whereof we affix our signatures in presence of two witnesses.

CHARLES E. POINTON.
JOHN E. POINTON.

Witnesses:
BERTRAM H. MATTHEWS,
GEORGE TAPPING.